United States Patent
Broda et al.

[11] Patent Number: 5,274,683
[45] Date of Patent: Dec. 28, 1993

[54] METHOD FOR REPLACING A NOZZLE

[75] Inventors: Paul M. Broda; Gary S. Carter, both of Lynchburg; Larry D. Dixon, Forest, all of Va.

[73] Assignee: B&W Nuclear Service Company, Lynchburg, Va.

[21] Appl. No.: 52,980

[22] Filed: Apr. 27, 1993

[51] Int. Cl.$^5$ .............................................. G21C 13/00
[52] U.S. Cl. ................................. 376/260; 376/307; 29/890.031
[58] Field of Search ............................ 376/260, 307; 29/890.031, 402.08

[56] References Cited

U.S. PATENT DOCUMENTS

| | | | |
|---|---|---|---|
| 5,091,140 | 2/1992 | Dixon et al. | 376/260 |
| 5,094,801 | 3/1992 | Dixon et al. | 376/307 |
| 5,149,490 | 9/1992 | Brown et al. | 376/307 |

Primary Examiner—Daniel D. Wasil
Attorney, Agent, or Firm—Robert J. Edwards; D. Neil LaHaye

[57] ABSTRACT

A method for replacing a nozzle in a pressure vessel. The existing nozzle is cut approximately at the inside surface of the pressure vessel wall. The portion of the existing nozzle that extends beyond the exterior of the pressure vessel wall is removed. A weld pad is deposited on the exterior of the pressure vessel wall around the nozzle bore. The remainder of the existing nozzle is removed. A corrosion resistant thermal spray coating is applied to the nozzle bore. A replacement nozzle is installed in the nozzle bore and seal welded to the weld pad on the exterior of the pressure vessel wall.

2 Claims, 1 Drawing Sheet

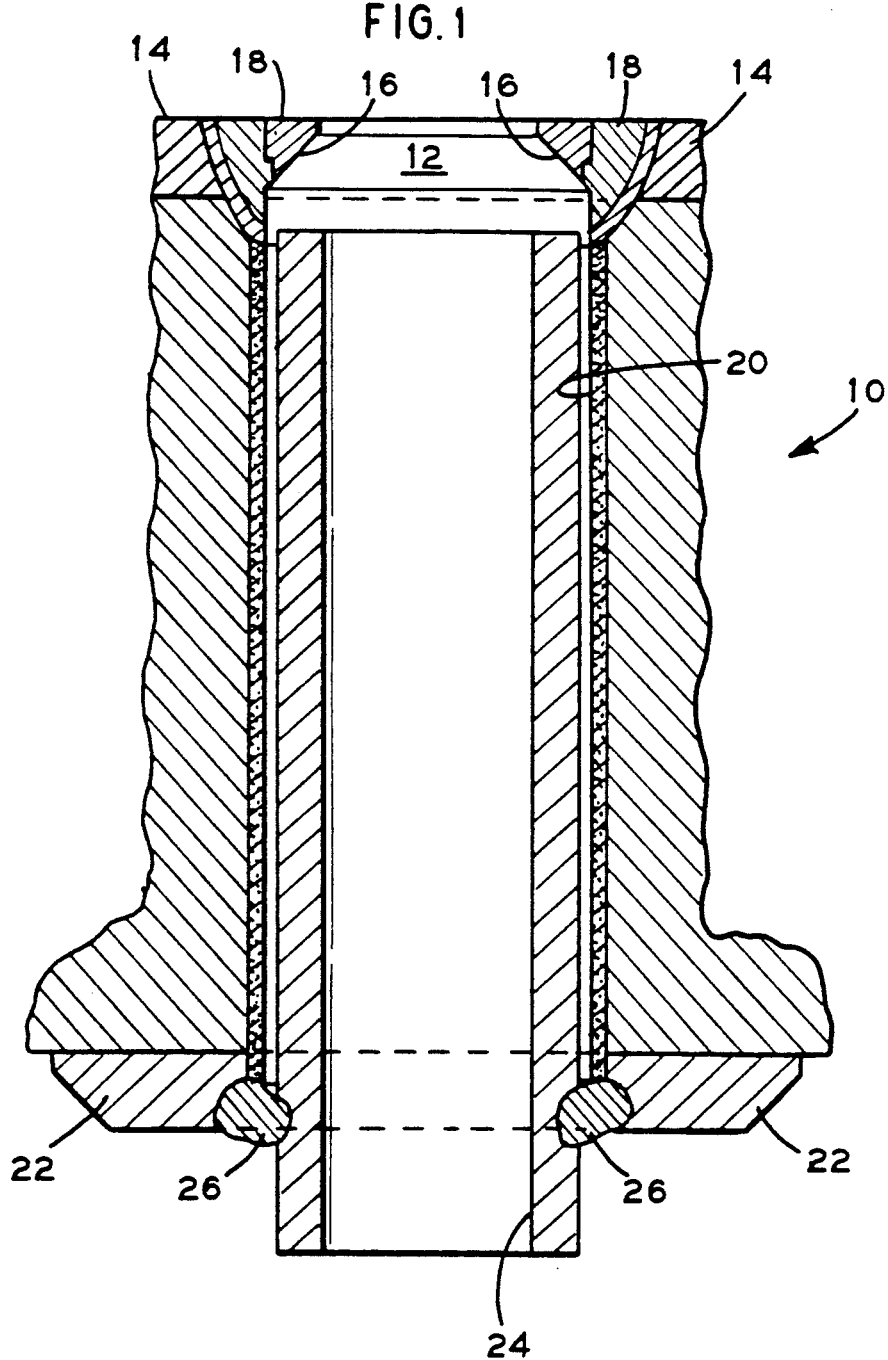

METHOD FOR REPLACING A NOZZLE

BACKGROUND OF THE INVENTION

1. Field of the Invention

The present invention is generally related to nuclear system pressure vessels and in particular to the replacement of nozzle penetrations in the pressure vessels.

2. General Background

The pressurizer in a nuclear reactor coolant system establishes and maintains the reactor coolant system pressure within the prescribed limits of the system. It provides a steam surge chamber and a water reserve to accommodate reactor coolant density changes during operation. A typical pressurizer is a vertical, cylindrical vessel with replaceable electric heaters in its lower section. The heater elements extend into the vessel through nozzle or sleeve penetrations in the vessel. The pressurizer also contains a plurality of nozzle penetrations at various locations for purposes such as sensing the liquid level or temperature in the pressurizer.

Due to the operating environment, it is a common requirement that sleeve or nozzles be replaced. In some instances the entire nozzle is removed and replaced while in others only a portion of a nozzle is removed and replaced. In either case, it is necessary during the replacement process to provide a seal that prevents water seepage between the replacement nozzle and the vessel wall. The pressure vessels are normally made from a low carbon steel and water seepage would cause corrosion of the vessel wall. Since pressurizer components in nuclear power plants become radioactive after they have been in operation, it is desirable to minimize the time and amount of work required inside the pressurizer.

Applicants are aware of the following patents directed to the replacement of nozzles or sleeves.

U.S. Pat. Nos. 5,094,801 and 5,091,140 disclose an apparatus and method for replacing a heater sleeve. The original sleeve is removed and the original bore in the pressurizer is enlarged. An outer sleeve is installed in the bore with its upper end being seal welded to the cladding on the interior of the pressurizer. An inner sleeve is installed in the outer sleeve to extend into the pressurizer and is welded to the lower end of the pressurizer.

U.S. Pat. No. 5,149,490 discloses a method and apparatus for replacing a nozzle where the entire nozzle has been removed. The nozzle bore is partially tapped and a replacement nozzle is threaded therein. The end of the replacement nozzle inside the vessel is seal welded to the inside of the pressurizer. A flange on the opposite end of the replacement nozzle bears against the exterior of the pressurizer.

The known art does not address the problems associated with the need for a seal weld at the junction of the replacement nozzle and the interior of the pressure vessel.

SUMMARY OF THE INVENTION

The present invention addresses the above problems in a straightforward manner. What is provided is a method for replacing a nozzle that eliminates the need for a seal weld at the junction of the replacement nozzle and the interior of the pressure vessel. The original nozzle is cut adjacent the interior wall of the pressure vessel. The portion of the original nozzle that extends beyond the exterior of the pressurizer is removed. A weld pad is deposited on the pressure vessel. The remainder of the original nozzle is removed from the nozzle bore. A corrosion resistant thermal spray coating is applied to the nozzle bore. A replacement nozzle is inserted in the bore and welded in place on the exterior of the pressurizer.

BRIEF DESCRIPTION OF THE DRAWINGS

For a further understanding of the nature and objects of the present invention reference should be had to the following description, taken in conjunction with the accompanying drawings in which like parts are given like reference numerals, and wherein:

The single FIGURE is a side sectional view that illustrates the invention.

DETAILED DESCRIPTION OF THE PREFERRED EMBODIMENT

The drawing illustrates a portion of a pressurizer vessel wall 10 having a nozzle bore 12 therethrough. The interior of the pressurizer is provided with a corrosion resistant cladding 14 such as stainless steel. In this drawing, existing nozzle remnant 16 remains in its original installed position at weld 18 approximately at the junction of cladding 14 and the interior of pressure vessel wall 10. The method of the invention is carried out as follows.

The original nozzle is cut by any suitable means such as machining approximately at the junction of cladding 14 and the interior of pressure vessel wall 10. The portion of the original nozzle that extends beyond the exterior of pressure vessel wall 10 is removed. A weld pad 22 is deposited on the exterior of pressure vessel wall 10 around nozzle bore 12. The remaining portion of the original nozzle is removed by any suitable means such as machining. The surface of nozzle bore 12 is then prepared to receive a thermal spray coating. Thermal spray coating 20 is then applied to nozzle bore 12. Thermal spray coating 20 is comprised of a material such as stainless steel, nickel-chromium, or monel that is corrosion resistant and acts as a liquid barrier to prevent corrosion of the carbon steel of pressure vessel wall 10. Replacement nozzle 24 is inserted into nozzle bore 12 and welded in position to weld pad 22 using partial penetration weld 26 all the way around replacement nozzle 24 and weld pad 22. Weld 26 provides the necessary seal at the exterior of pressure vessel wall 10. Replacement nozzle 24 is formed from a corrosion resistant material as the original nozzle was. Therefore, no corrosion will occur to pressure vessel wall 10 or replacement nozzle 24 as a result of any liquid seepage between replacement nozzle 24 and thermal spray coating 20.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for replacing an existing nozzle in a pressure vessel having a nozzle extending into the vessel through a nozzle bore in the pressure vessel wall, comprising:

a. cutting the existing nozzle approximately at the inside surface of the pressure vessel wall and removing the portion of the existing nozzle that extends beyond the exterior of the pressure vessel wall;

b. depositing a weld pad on the exterior of the pressure vessel wall around the nozzle bore;

c. removing the remaining portion of the existing nozzle in the nozzle bore;

d. depositing a corrosion resistant thermal spray coating in the nozzle bore;

e. installing a replacement nozzle in the nozzle bore; and f. seal welding the replacement nozzle to the weld pad on the exterior of the pressure vessel wall.

2. The method of claim 1, wherein said seal welding step comprises providing a partial penetration weld in the weld pad and the replacement nozzle.

* * * * *